(12) United States Patent
Robichaux et al.

(10) Patent No.: US 11,873,611 B2
(45) Date of Patent: Jan. 16, 2024

(54) COLLECTION DEVICE FOR DEBRIS AND ANIMAL WASTE

(71) Applicants: Jerry Robichaux, Orlando, FL (US); Nurcan Robichaux, Orlando, FL (US)

(72) Inventors: Jerry Robichaux, Orlando, FL (US); Nurcan Robichaux, Orlando, FL (US)

( * ) Notice: Subject to any disclaimer, the term of this patent is extended or adjusted under 35 U.S.C. 154(b) by 87 days.

(21) Appl. No.: 17/585,426

(22) Filed: Jan. 26, 2022

(65) Prior Publication Data
US 2022/0235527 A1 Jul. 28, 2022

Related U.S. Application Data

(63) Continuation-in-part of application No. 29/800,864, filed on Jul. 23, 2021.
(Continued)

(51) Int. Cl.
*E01H 1/08* (2006.01)
*A01K 23/00* (2006.01)
(Continued)

(52) U.S. Cl.
CPC ......... *E01H 1/0836* (2013.01); *A01K 23/005* (2013.01); *A47L 5/28* (2013.01); *A47L 9/12* (2013.01); *A47L 9/1666* (2013.01)

(58) Field of Classification Search
CPC . E01H 1/1206; A47L 5/24; A47L 5/36; A47L 9/009; A47L 9/325; A47L 5/225; A47L 9/1666; A47L 9/12
(Continued)

(56) References Cited

U.S. PATENT DOCUMENTS

| 4,156,952 A * | 6/1979 | Lynch, Jr. ............ A47L 11/4088 |
|---|---|---|
| | | 15/381 |
| 8,549,703 B2 * | 10/2013 | Smith .................. H01M 50/213 |
| | | 15/351 |

(Continued)

FOREIGN PATENT DOCUMENTS

WO  WO-2010115978 A1 * 10/2010 ............... A47L 5/24

OTHER PUBLICATIONS

The Beetl Is a Roomba-Like Robot That Roams Around Your Yard, Picking Up All The Dog Poop It Finds, Retrieved from Internet, Jul. 29, 2019 <URL: https://oddity mall.com/beetl-autonomous-dog-poop-robot>.

*Primary Examiner* — Don M Anderson
*Assistant Examiner* — Sarah Akyaa Fordjour

(57) ABSTRACT

A collection device for debris and animal waste is an apparatus that optimizes airflow to effectively and safely collect debris, preferably pet waste. The apparatus includes a canister, at least one handle assembly, an airflow inlet nozzle, a portable power source, and a fan assembly. The canister houses collected debris and the fan assembly. The at least one handle assembly, the airflow inlet nozzle, and the portable power source are mounted with the canister. The at least one handle assembly allows a user to easily maneuver the canister and the airflow inlet nozzle. The fan assembly suctions debris into a debris chamber of the canister through the airflow inlet nozzle. The portable power source provides the necessary power for the fan assembly to operate. The apparatus further includes an air-permeable collection bag that is housed within the debris chamber to facilitate the removal of collected pet waste within the canister.

5 Claims, 6 Drawing Sheets

Related U.S. Application Data

(60) Provisional application No. 63/142,126, filed on Jan. 27, 2021.

(51) Int. Cl.
    *A47L 5/28*     (2006.01)
    *A47L 9/12*     (2006.01)
    *A47L 9/16*     (2006.01)

(58) Field of Classification Search
    USPC .............................................. 15/344; 294/1.3
    See application file for complete search history.

(56) References Cited

U.S. PATENT DOCUMENTS

| | | |
|---|---|---|
| 8,631,540 B2 | 1/2014 | Robichaux |
| 9,974,282 B2 | 5/2018 | Castano |
| 10,766,132 B2 | 9/2020 | Romanov |
| 2004/0194248 A1 | 10/2004 | Holtz |
| 2013/0205536 A1* | 8/2013 | Robichaux .............. E01H 1/006 |
| | | 15/327.1 |
| 2017/0303754 A1* | 10/2017 | Conrad .................... A47L 5/24 |

\* cited by examiner

COLLECTION DEVICE FOR DEBRIS AND ANIMAL WASTE

The current application claims a priority to the U.S. Provisional Patent application Ser. No. 63/142,126 filed on Jan. 27, 2021.

The current application is also a continuation-in-part (CIP) application of the U.S. design application Ser. No. 29/800,864 filed on Jul. 23, 2021.

FIELD OF THE INVENTION

The present invention generally relates to collection devices. More specifically, the present invention is a collection device for debris and animal waste.

BACKGROUND OF THE INVENTION

Animal caretakers, groundskeepers, and pet owners must routinely clean up animal waste from animal enclosures, yards, and other areas where animals leave waste. For most responsible individuals, picking up animal waste requires them to handle the solid animal matter with either a glove or cumbersome apparatus. Often because the mechanical methods leave residual waste on the surface, water or some other liquid must be applied to remove the residual waste and sterilize the area to prevent the spread of harmful diseases, such as the Parvo virus.

Cleaning collection devices in this manner wastes water and can also contribute to the spread of animal waste and harmful chemicals in liquified form. While both situations offer disadvantages, current methods are generally considered to be time consuming, messy, unpleasant, and difficult in some cases. Furthermore, a practical handheld vacuum for outdoor use is in demand for grounds keepers to collect other types of small debris such as, but not limited to, cigarette butts, bottle caps, golf balls, tree acorns, and wild animal excrement from geese, deer, and farm animals. There are limited choices for these applications as well.

While the unpleasant job of handling animal waste is inescapable for responsible individuals and businesses, apparatuses have been designed and created to minimize the various negative aspects associated with cleaning up animal waste. The apparatuses developed for collecting solid animal waste can be largely placed into two categories distinguished by the approach to collection. The first category of apparatuses requires mechanical manipulation. Such devices typically require the user to position the apparatus appropriately and shovel the solid waste matter into the apparatus. The second category of apparatuses uses a mechanical component to siphon or vacuum the animal waste into a receptacle. Generally, the vacuum-type apparatuses do not provide features that would be truly effective for collecting pet waste in both indoor and outdoor settings. Thus, there is a need to develop a device to solve this problem.

It is therefore an objective of the present invention to address problems associated with and/or otherwise improve upon conventional devices. The present invention is an innovative vacuum device designed to provide a convenient, effective means for the collection of pet waste, wild animal excrement, and small debris, while incorporating other problem-solving features. The present invention is designed for the collection of animal feces or waste matter that is discharged from the bowels after food has been digested, also known as excrement. The present invention collects pet waste and animal waste for both indoor and outdoor settings. Examples of indoor settings include semi-enclosed kennels, animal pens, and other interior spaces where animals are kept.

DETAILED DESCRIPTIONS OF THE INVENTION

Figure 1:
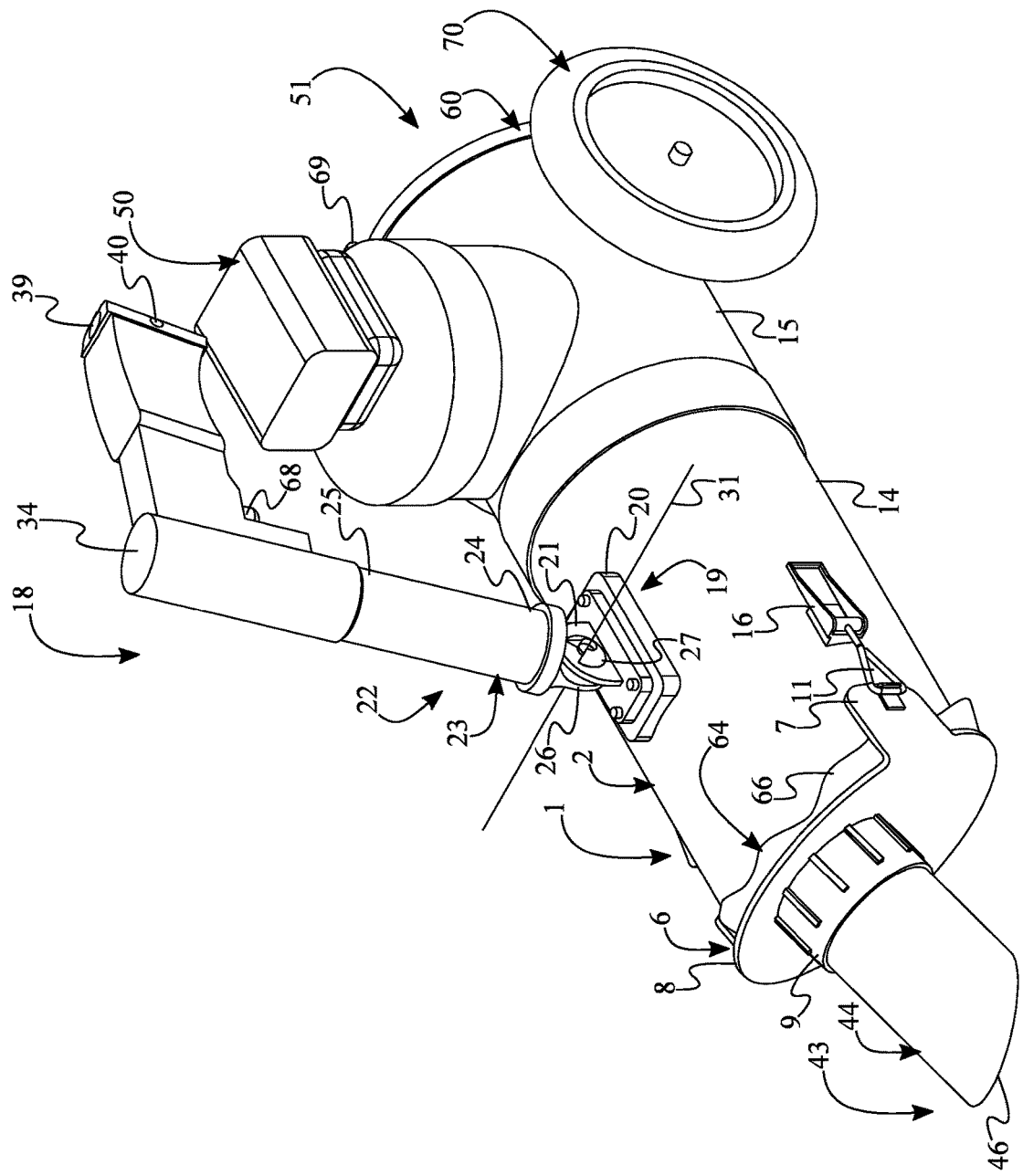
FIG. 1 is a front perspective view of a first embodiment of the present invention with an air-permeable collection bag.

All illustrations of the drawings are for the purpose of describing selected versions of the present invention and are not intended to limit the scope of the present invention.

The present invention is a collection device for debris and animal waste. The present invention optimizes airflow in order to effectively collect debris, pet waste, and wild animal excrement in both indoor and outdoor areas. The present invention safely contains debris until the area is clear of debris or the canister 1 is full. The present invention limits or eliminates any direct contact between the hands of the user and the pet waste throughout collection. In order to collect debris, preferably animal waste, the present invention comprises a canister 1, at least one handle assembly 18, an airflow inlet nozzle 43, a portable power source 50, and a fan assembly 51, seen in FIG. 1, FIG. 2, FIG. 3, FIG. 4, and FIG. 5. The canister 1 houses the collected pet waste and fan assembly 51. Furthermore, the canister 1 upholds the airflow inlet nozzle 43 and the portable power source 50. The canister 1 comprises a cylindrical body 2, a lid 6, a debris hole 13, a debris chamber 14, and a suction chamber 15. The cylindrical body 2 is a rigid body that contains the collected pet waste and the fan assembly 51 and defines the airflow into and out of the canister 1. More specifically, the cylindrical body 2 comprises an inlet 3 and an outlet 4. The airflow traverses into the canister 1 through the inlet 3 and exits the canister 1 through the outlet 4. The lid 6 covers the inlet 3 and mounts the airflow inlet nozzle 43 with the cylindrical body 2. The debris hole 13 provides passage for debris through the lid 6 and through the inlet 3. The debris chamber 14 is the portion of the canister 1 that retains the collected pet waste. The suction chamber 15 is the portion of the canister 1 that houses the fan assembly 51 and separates the fan assembly 51 from the collected pet waste.

Furthermore, the at least one handle assembly 18 allows a user to maneuver the canister 1, and consequently the airflow inlet nozzle 43 towards pet waste, seen in FIG. 1, FIG. 2, FIG. 3, FIG. 4, and FIG. 5. The airflow inlet nozzle 43 directs the pet waster into the canister 1 as well as the suction of the airflow around targeted pet waste. The portable power source 50 provides the necessary power for the fan assembly 51 to operate. In the preferred embodiment of the present invention, the portable power source 50 is preferably a portable battery that may be recharged or replaced. The fan assembly 51 generates airflow which in turn creates a vacuum within the canister 1.

The overall configuration of the aforementioned components allows a user to readily retrieve debris and animal waste without having to directly pick up the debris with hands. In order to provide a continuous flow of air through the canister 1, the inlet 3 is positioned opposite the outlet 4 along the cylindrical body 2, seen in FIG. 5. The lid 6 is hermetically attached across the inlet 3, thereby channeling air flow into the canister 1 through the airflow inlet nozzle 43 and preventing any pet waste from falling out of the canister 1 after the pet waste has already been retrieved. The pet waste is directed by the airflow inlet nozzle 43 into the canister 1 as the debris hole 13 traverses through the lid 6. In order for the airflow inlet nozzle 43 to siphon pet waste into the canister 1, the airflow inlet nozzle 43 is externally positioned with the canister 1. The airflow inlet nozzle 43 is hermetically attached into the debris hole 13, thereby maintaining the continuous airflow into the canister 1. In order prevent pet waste from coming into contact with the fan assembly 51, the debris chamber 14 is positioned within the cylindrical body 2, adjacent to the inlet 3. Furthermore, the suction chamber 15 is positioned within the cylindrical body 2, adjacent to the outlet 4, maximizing the suction created by the airflow of the fan assembly 51. The airflow remains continuous through the canister 1 as the inlet 3 is in fluid communication with the debris chamber 14, the debris chamber 14 is in fluid communication with the suction chamber 15, and the suction chamber 15 is in fluid communication with the outlet 4. The airflow into the canister 1 therefore positions any collected pet waste into the debris chamber 14 before the suction chamber 15. The fan assembly 51 is mounted within the suction chamber 15, providing the debris chamber 14 enough space to contain pet waste. The at least one handle assembly 18 and the portable power source 50 is laterally mounted with the cylindrical body 2 in order for the user to easily access the at least one handle assembly 18 and the portable power source 50. In order for the fan assembly 51 to generate airflow, the portable power source 50 is electrically connected with the fan assembly 51.

Figure 5:
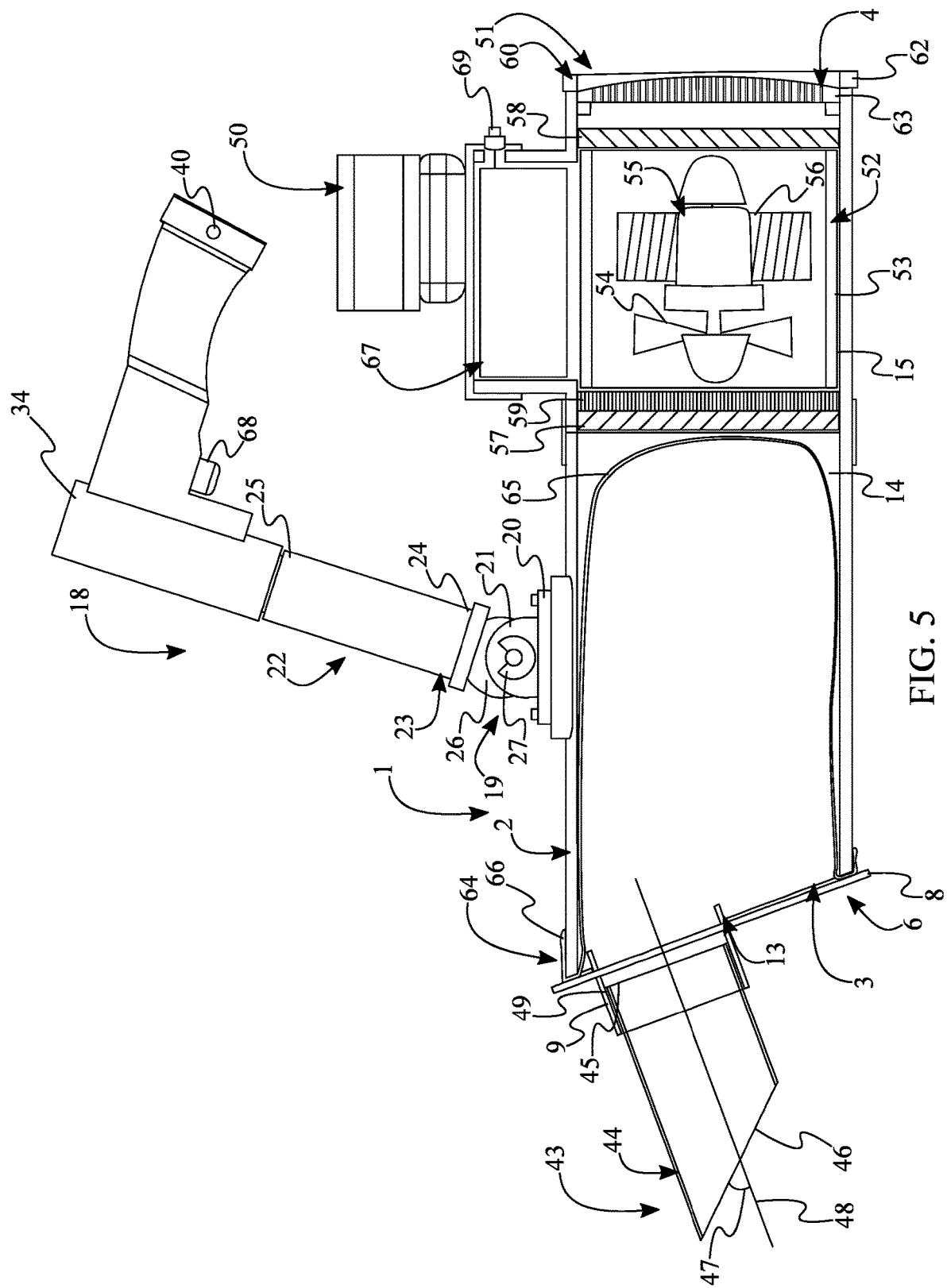
FIG. 5 is a side schematic view of the first embodiment of the present invention with the air-permeable collection bag.

In order for the airflow inlet nozzle 43 to be readily attached and detached with the lid 6, the airflow inlet nozzle 43 comprises a nozzle body 44 and a rim 49, seen in FIG. 5. The nozzle body 44 is a rigid extension for the lid 6 that targets the airflow around nearby pet waste. The nozzle body 44 comprises a first edge 45 and a second edge 46. The first edge 45 engages with the lid 6, and the second edge 46 surrounds pet waste. The rim 49 serves to connect the nozzle body 44 with the lid 6. In order for the lid 6 to enclose the inlet 3, the lid 6 comprises a lip 7, a base wall 8, and an adapter 9. The canister 1 is flushed within the lid 6 as the lip 7 is fixed onto the base wall 8 and is peripherally positioned about the base wall 8. The base wall 8 is positioned across the inlet 3, thereby channeling air flow into the canister 1 through the airflow inlet nozzle 43 and stopping any collected pet waste from falling out of the canister 1. In order for the base wall 8 to remain positioned across the entirety of the inlet 3, the lip 7 is laterally positioned around the cylindrical body 2. The pet waste enters the canister 1 as the debris hole 13 traverses through the base wall 8. In order for the airflow inlet nozzle 43 to be engaged with the lid 6 and oriented towards pet waste, the adapter 9 is fixed onto the base wall 8, opposite the lip 7 and is perimetrically positioned around the debris hole 13. Pet waste traverses along and within the nozzle body 44 as the first edge 45 is positioned opposite the second edge 46 about the nozzle body 44. The rim 49 is laterally fixed around the nozzle body 44, adjacent with the first edge 45, as the first edge 45 engages with the lid 6. In order to maintain a secure connection between the airflow inlet nozzle 43 and the lid 6, the rim 49 is engaged within the adapter 9. In the preferred embodiment of the present invention a central axis 10 of the adapter 9 is oriented at an obtuse angle with a central axis 5 of the cylindrical body 2. This arrangement angles the nozzle body 44 downwards towards selected pet waste. In order to facilitate the suctioning of the selected pet waste through the debris hole 13 and into the debris chamber 14, the central axis 10 of the adapter 9 is positioned offset from the central axis 5 of the cylindrical body 2. More specifically, the central axis 10 of the adapter 9 is positioned opposite the ground or elevated, preventing the debris hole 13 from being blocked by collected pet waste within the debris chamber 14. Moreover, the first edge 45 is positioned normal to a central axis 48 of the nozzle body 44. The second edge 46 is positioned at an angle 47 to the central axis 48 of the nozzle body 44, facilitating the retrieval of pet waster along the ground. The canister 1 may remain slightly angled with the ground instead of oriented normal with the ground, directly on top of selected pet debris.

In a first embodiment of the present invention, the canister 1 further comprises a first latch mechanism 16 and a second latch mechanism 17, seen in FIG. 1, FIG. 2, FIG. 3, and FIG. 4. The first latch mechanism 16 and the second latch mechanism 17 connect and disconnects the lid 6 with the cylindrical body 2. The first latch mechanism 16 and the second latch mechanism 17 provide access into the canister 1, specifically the debris chamber 14, for removal of collected pet waste. As previously mentioned, the lid 6 comprises a lip 7, a base wall 8, and an adapter 9. The lid 6 further comprises a first hook 11 and a second hook 12. The first hook 11 connects the lip 7 with the first latch mechanism 16. Similarly, the second hook 12 connects the lip 7 with the second latch mechanism 17. In order to enclose the cylindrical body 2, the lip 7 is fixed onto the base wall 8 and is peripherally positioned about the base wall 8. The base wall 8 is positioned across the inlet 3, thereby channeling air flow into the canister 1 through the airflow inlet nozzle 43 and stopping the collected pet waste from falling out of the canister 1. In order for the base wall 8 to remain positioned across the entirety of the inlet 3, the lip 7 is laterally positioned around the cylindrical body 2. The lid 6 is evenly secured around the cylindrical body 2 as the first hook 11 and the second hook 12 are positioned opposite each other about the lip 7. The first hook 11 and the second hook 12 are laterally fixed onto the lip 7, preserving the arrangement of the lip 7 around the cylindrical body 2. In order for the first latch mechanism 16 and the second latch mechanism 17 to be accessible by the user, the first latch mechanism 16 and the second latch mechanism 17 are laterally integrated into the cylindrical body 2. In order for the first latch mechanism 16 and the second latch mechanism 17 to be aligned with the first hook 11 and the second hook 12, respectively, the first latch mechanism 16 and the second latch mechanism 17 are positioned opposite each other about the cylindrical body 2. The lid 6 may be connected and disconnected from the cylindrical body 2 as the first latch mechanism 16 is operatively coupled with the first hook 11, wherein the first latch mechanism 16 is used to attach the first hook 11 to the cylindrical body 2 and is used to detach the first hook 11 from the cylindrical body 2. Likewise, the second latch mechanism 17 is operatively coupled with the second hook 12, wherein the second latch mechanism 17 is used to attach the second hook 12 to the cylindrical body 2 and is used to detach the second hook 12 from the cylindrical body 2. The detachment of the first latch mechanism 16 or the detachment of the second latch mechanism 17 provides entry within the cylindrical body 2. However, both the first latch mechanism 16 and the second latch mechanism 17 need to be detach simultaneously in order for the lid 6 to be completely separate from the cylindrical body 2.

The cleaning of the present invention, specifically the canister 1, is significantly minimized as the present invention further comprises an air-permeable collection bag 64, seen in FIG. 1 and FIG. 5. The air-permeable collection bag 64 serves as a protective layer for the debris chamber 14. The air-permeable collection bag 64 prevents the collected pet waste from coming into contact with the debris chamber 14. In order for the collected pet waste to be collectively removed from within the debris chamber 14 with the air-permeable collection bag 64, the air-permeable collection bag 64 comprises a closed bag end 65 and an open bag end 66. The closed bag end 65 covers the suction chamber 15, protecting the fan assembly 51 from coming into contact with collected pet debris. The open bag end 66 allows the pet waste to enter into the air-permeable collection bag 64, and consequently into the debris chamber 14. In order for the pet waste to be suctioned into the cylindrical body 2, the air-permeable collection bag 64 is positioned into the debris chamber 14 through the inlet 3. The closed bag end 65 is positioned adjacent to the suction chamber 15, stopping any collected pet waste from entering the suction chamber 15. In order for the air-permeable collection bag 64 to not get dislodged and to be superimposed across the debris chamber 14, the open bag end 66 is positioned around the inlet 3 and is pressed in between the lid 6 and the inlet 3.

Figure 6:
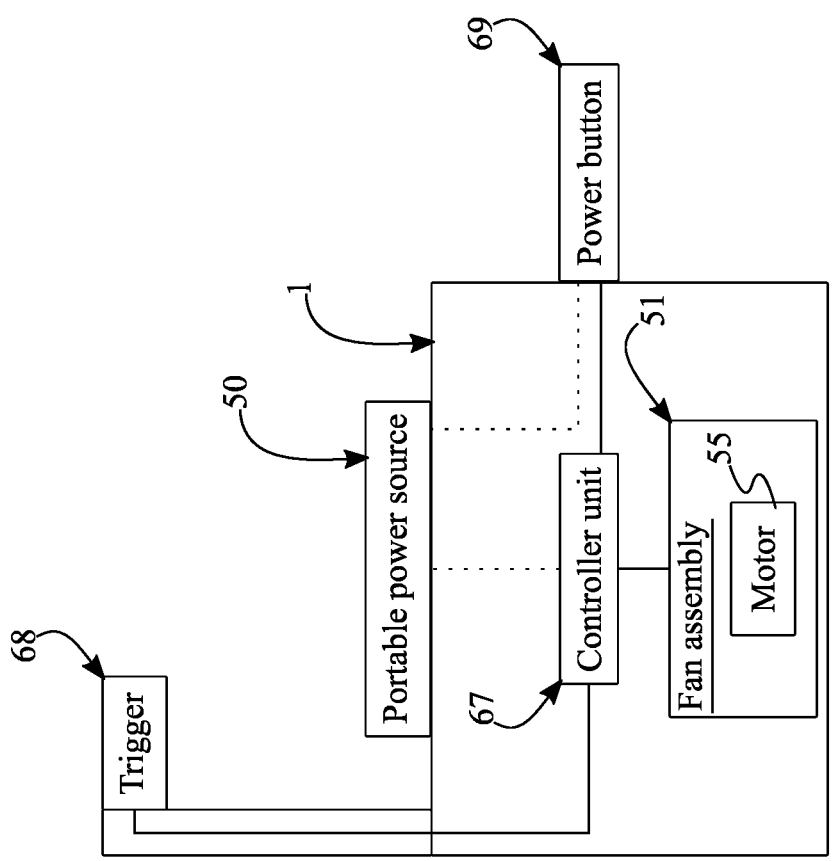
FIG. 6 is a schematic view for the electronic components of the present invention.

In a first embodiment of the present invention, the present invention further comprises a controller unit 67 and a trigger 68, seen in FIG. 5 and FIG. 6. The controller unit 67 process and manages each input from the trigger 68 in order to control the fan assembly 51. The trigger 68 receives the manual input from a user to operate the fan assembly 51. The trigger 68 provides a reference signal that changes as the trigger 68 is depressed. The controller unit 67 receives the reference signal and translates that into a motor speed control reference. The controller unit 67 then applies an appropriate level of voltage to the motor 55 of the fan assembly 51 to achieve the desired speed. Furthermore, the at least one handle assembly 18 comprises a clamp base 19, a handlebar receiver 22, a first fastener 27, a handlebar 28, and a handle grip 33, seen in FIG. 1, FIG. 2, FIG. 4, and FIG. 5. The clamp base 19 serves as a mount for the handlebar receiver 22 with the canister 1. The first fastener 27 secures and orients the handlebar receiver 22 with the clamp base 19. The handlebar 28 connects the handle grip 33 with the handlebar receiver 22. The handlebar 28 provides an ergonomic grip for the user to maneuver the canister 1 and engage the trigger 68. The handle grip 33 is positioned offset from the canister 1 as the handlebar 28 comprises a proximal bar and a distal bar end 30. The proximal bar end 29 connects the handlebar 28 with the handlebar receiver 22. The distal bar end 30 receives and upholds the handle grip 33. In order for the handlebar 28 to be connected with the canister 1, the clamp base 19 is laterally mounted onto the cylindrical body 2. The handlebar 28 is connected with the clamp base 19 as the handlebar receiver 22 is positioned adjacent with the clamp base 19. The handlebar receiver 22 is rotatably connected with the clamp base 19, allowing the handlebar 28 to be angled. More specifically, a rotation axis 31 of the handlebar receiver 22 is positioned perpendicular with a central axis 5 of the cylindrical body 2 such that the handlebar 28 is oriented along the central axis 5 of the cylindrical body 2 regardless of the angle of the handlebar 28 with the cylindrical body 2. In order for the handlebar receiver 22 and, consequently, the handlebar 28 to be readily adjusted, the first fastener 27 is operatively coupled with the handlebar receiver 22 and the clamp base 19, wherein the first fastener 27 is used to lock the handlebar receiver 22 in a selected orientation with the clamp base 19 and is used to unlock the handlebar receiver 22 from the selected orientation with the clamp base 19. In order for the handlebar 28 to be maneuvered by the handlebar receiver 22, the proximal bar end 29 is attached into the handlebar receiver 22, opposite the clamp base 19. The handle grip 33 is fixed adjacent with the distal bar end 30, therefore positioning the handlebar 28 and, consequently, the handle grip 33 closer to the hand of the user. The control of the fan assembly 51 is quickly and easily engaged by the user as the trigger 68 is integrated into the handle grip 33. The weight of the present invention is balanced as the controller unit 67 is mounted within the canister 1, adjacent to the portable power source 50. Moreover, this arrangement provides protection for the controller unit 67. The controller unit 67 is electronically connected to the trigger 68 and the fan assembly 51, thereby processing the inputs of the trigger 68 and controlling the rotational speed of the fan assembly 51. In the preferred embodiment of the present invention, the trigger 68 adjusts the speed of the fan assembly 51 which in turn adjusts the amount of air flow generated by the fan assembly 51. This assists the user in the collection of debris by being able to control the amount of suction applied. Furthermore, the variable speed of the fan assembly 51 increases and decreases the amount of power used by the fan assembly 51, thus conserving limited battery power. In order for the controller unit 67 and the trigger 68 to operate, the portable power source 50 is electrically connected to the controller unit 67, providing the necessary power for the controller unit 67. It is understood that as the user progressively depresses the trigger, this action provides a control reference that signals the controller to increase the speed of the fan assembly 51.

In order to turn on and turn off the portable power source 50 in the present invention and override any other controls, the present invention further comprises a power button 69, seen in FIG. 1, FIG. 2, FIG. 3, FIG. 4, FIG. 5, and FIG. 6. The power button 69 disconnects the connection with the controller unit 67 and the fan assembly 51. The power button 69 is accessible as the power button 69 is externally mounted onto the canister 1, adjacent to the controller unit 67. In order to for a user to disconnect and connect the flow of power with the fan assembly 51, the power button 69 is electronically connected with the controller unit 67. The power supply from the portable power source 50 is connected and disconnected with the power button 69 as the power button 69 is electrically connected with the portable power source 50.

In order for the angle of the handlebar receiver 22 to be readily adjusted, in the preferred embodiment of the present invention, the clamp base 19 comprises a base plate 20 and a first mounting plate 21. Furthermore, the handlebar receiver 22 comprises a socket member 23 and a second mounting plate 26, seen in FIG. 1, FIG. 2, FIG. 3, FIG. 4, and FIG. 5. The base plate 20 conforms around the cylindrical body 2 and the first mounting plate 21 provides a secure connection for clamp base 19 with the handlebar receiver 22. Similarly, the socket member 23 conforms around the proximal bar end 29. The second mounting plate 26 provides a stable secure connection for handlebar receiver 22 with the clamp base 19. The handlebar receiver 22 and, consequently, the handlebar 28 to remain upright regardless of the angle between the handlebar 28 and the cylindrical body 2, the first mounting plate 21 is positioned perpendicular to the base plate 20. The first mounting plate 21 is fixed onto the base plate 20, opposite the cylindrical body 2, structurally reinforcing the clamp base 19. In order for the handlebar 28 to be upheld with the socket member 23, a closed socket end 24 of the socket member 23 is peripherally fixed with the second mounting plate 26. The closed end stops the handlebar 28 from falling through the socket member 23. The handlebar 28 is readily positioned into the socket member 23 as an open socket end 25 of the socket member 23 is positioned offset from the second mounting plate 26. The open socket end 25 provides passage into the socket member 23 while preserving the structural integrity of the socket member 23. The proximal bar end 29 is attached into the open socket end 25, securing the connection of the handlebar 28 within the handlebar receiver 22. The orientation of the handlebar 28 with the cylindrical body 2 is preserved as the first mounting plate 21 is laterally positioned with the second mounting plate 26. The first mounting plate 21 is rotatably connected with the second mounting plate 26.

In a second embodiment of the present invention, the handlebar 28 is extendable. In the second embodiment of the present invention, the at least one handle assembly 18 further comprises a clamping collar 35, seen in FIG. 3. Moreover, the handlebar 28 further comprises a main tube 32 and an extension tube. The clamping collar 35 connects the main tube 32 with the extension tube 33. The main tube 32 positions the extension tube 33 with the cylindrical body 2. Furthermore, the main tube 32 and the extension tube 33 define an overall height for the handlebar 28. A minimum height of the handlebar 28 is defined by the main tube 32 as the main tube 32 is positioned adjacent with the handlebar receiver 22. The overall height of the handlebar 28 is extendable with the extension tube 33 as the extension tube 33 is telescopically engaged into the main tube 32, opposite the handlebar receiver 22. More specifically, the overall height is defined by both the main tube 32 and the extension tube 33 as the proximal bar end 29 is positioned coincident with the main tube 32, offset the extension tube 33, and the distal bar end 30 is positioned coincident with the extension tube 33, offset from the main tube 32. In order to secure a desired position of the extension tube 33 within the main tube 32, the clamping collar 35 is operatively coupled with the extension tube 33, wherein the clamping collar 35 is used to lock a selected positioned of the extension tube 33 along the main tube 32 and is used to unlock the selected positioned of the extension tube 33 along the main tube 32.

Figure 3:
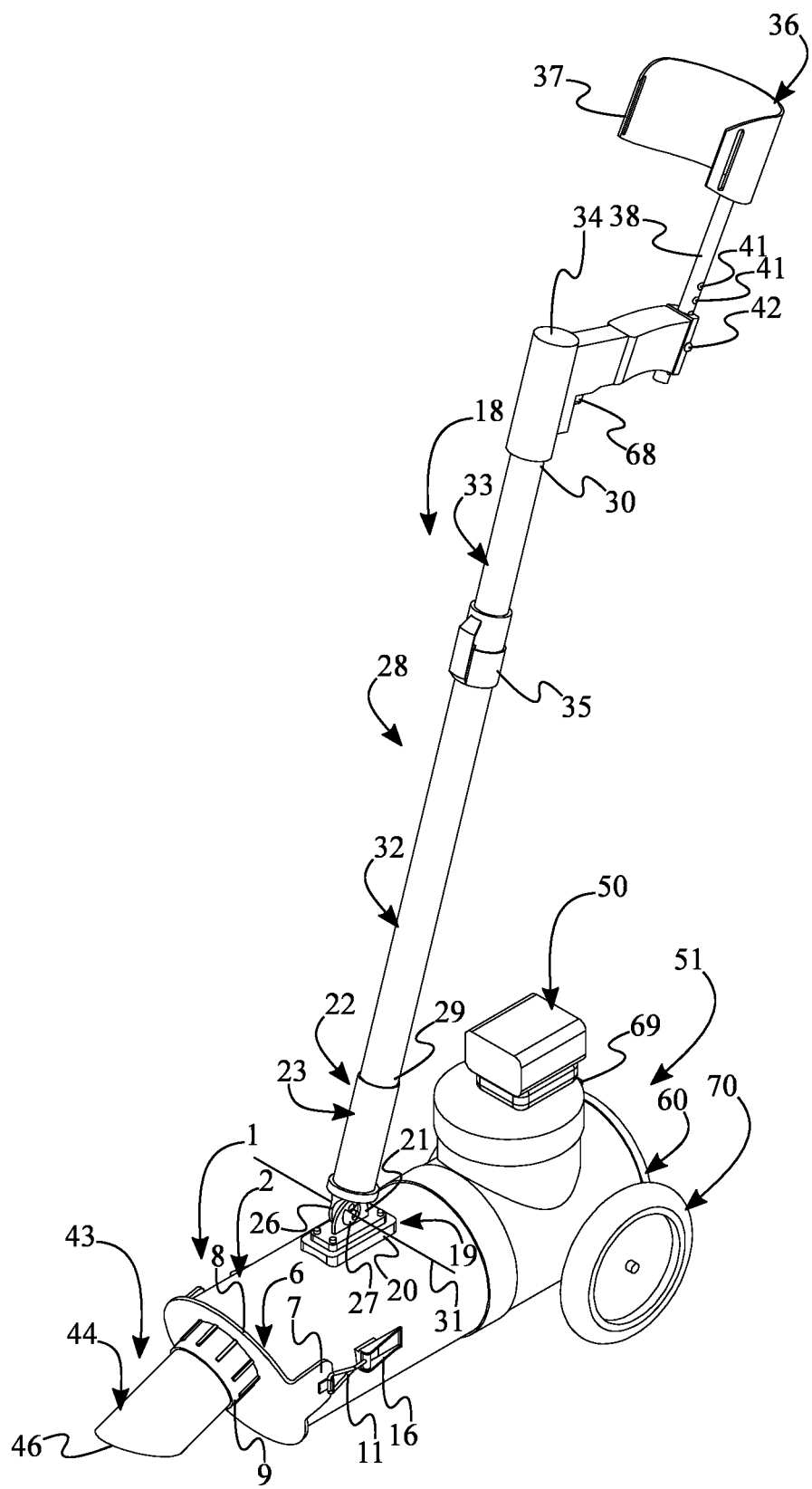
FIG. 3 is a front perspective view of a second embodiment of the present invention.
Figure 4:
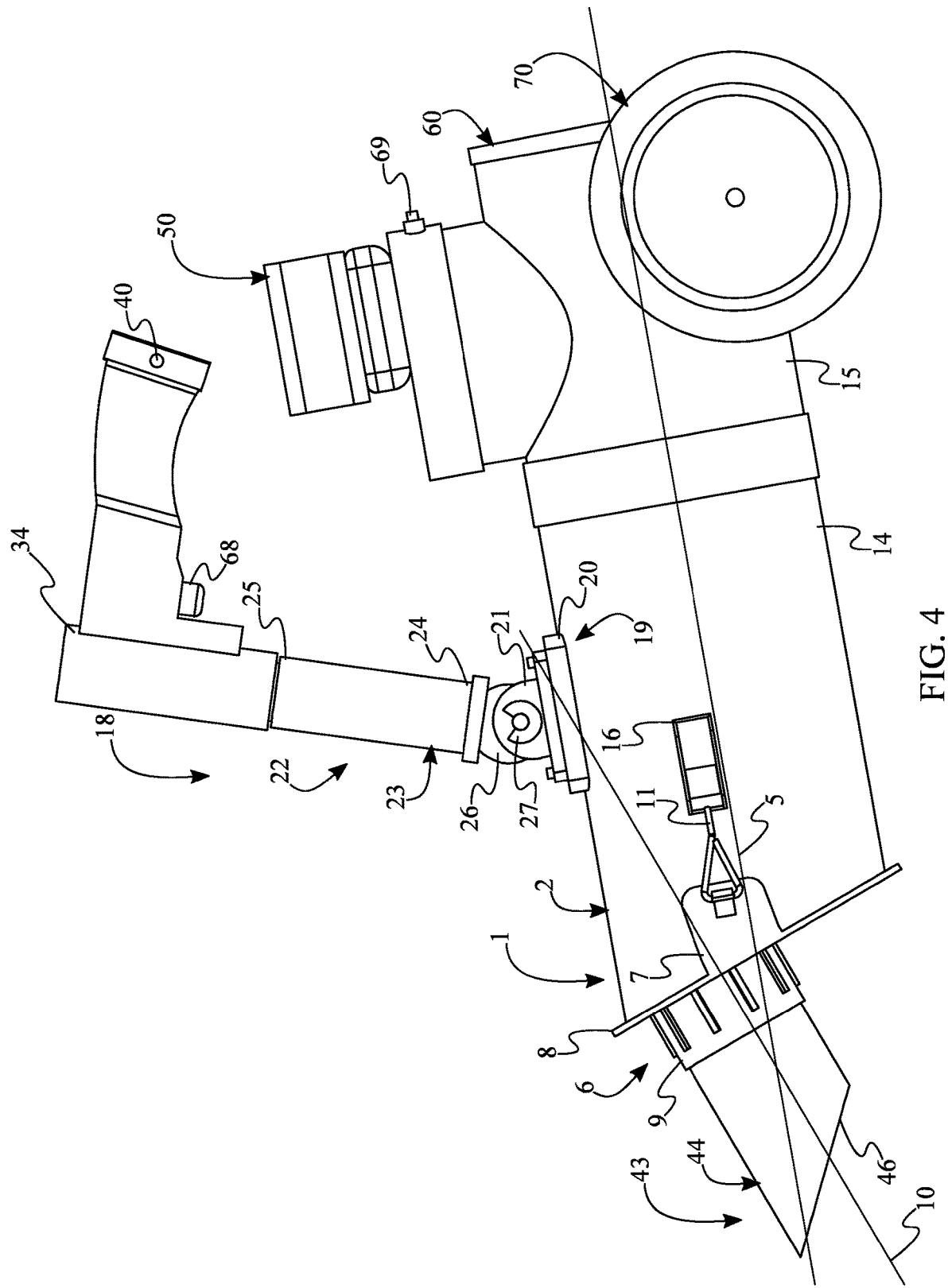
FIG. 4 is a side view of the first embodiment of the present invention.

In order for the weight of the present invention to be counterbalanced and easily maneuvered by a user, the second embodiment of the present invention preferably comprises at least one handle assembly 18 that further comprises a forearm brace 36, an extension post 38, a post-receiving channel 39, a main hole 40, a plurality of secondary holes 41, and a fastener 42, also seen in FIG. 3. The forearm brace 36 presses against the forearm of the user while the user grasps the handle grip 33. The extension post 38 offsets the forearm brace 36 with the handle grip 33 and connects the forearm brace 36 with the handle grip 33. The post-receiving channel 39 provides passage for the extension post 38 through the handle grip 33 while preserving the structural integrity of the handle grip 33. Similarly, the main hole 40 provides passage of the fastener 42 through the handle grip 33 and the post-receiving channel 39 while preserving the structural integrity of the handle grip 33. The plurality of secondary holes 41 allows the fastener 42 to traverse through the extension post 38, and consequently the handle grip 33, while preserving the structural integrity of the extension post 38. Furthermore, the plurality of secondary holes 41 allows the distance between the handle grip 33 and the forearm brace 36 to be adjustable. The fastener 42 secures the position of the extension post 38 within the post-receiving channel 39. In order for the forearm of the user to be readily positioned within the forearm brace 36, a brace opening 37 of the forearm brace 36 is positioned offset from the extension post 38 and is oriented towards the handlebar 28. The brace opening 37 provides enough space for the forearm of the user to be positioned within the forearm brace 36 while maintaining the contour of the forearm brace 36 around the forearm of the user. The forearm brace 36 is terminally fixed with the extension post 38 effectively connecting the forearm brace 36 with the handle grip 33 without limiting the range of movement by the corresponding arm of the user. In order for the hand of the user to grasp the handle grip 33 while the forearm is simultaneously positioned within the forearm brace 36, the post-receiving channel 39 laterally traverses through the handle grip 33 and is positioned offset from the handlebar 28 along the handle grip 33. Furthermore, the post-receiving channel 39 is oriented at an obtuse angle with the handle grip 33, thereby preserving the ergonomic structure of the handle grip 33 and the handle grip 33 with the forearm brace 36. In order to prevent the extension post 38 from slipping entirely through the post-receiving channel 39, the main hole 40 laterally traverses through the handle grip 33, and the post-receiving channel 39 is perpendicularly intersected by the main hole 40. The fastener 42 may continuously traverse through the handle grip 33 and the extension post 38 as each of the plurality of secondary holes 41 laterally traverses through the extension post 38. The plurality of secondary holes 41 is positioned offset from the forearm brace 36 along the extension post 38, providing variable distances between the handle grip 33 and the forearm brace 36 for users with various sized arms. A desired distance between the forearm brace 36 and the handle grip 33 is locked as the fastener 42 is engaged through the main hole 40 and through a selected hole from the plurality of secondary holes 41.

In order to maximize the efficiency of the fan assembly 51 while effectively preventing any pet waste from traversing past the debris chamber 14, the present invention further comprises a controller unit 67, and the fan assembly 51 comprises a suction fan 52, a first mesh filter 57, a second mesh filter 58, a debris screen 59, and at least one exhaust screen 60, seen in FIG. 5. Furthermore, the suction fan 52 comprises a housing 53, an impeller 54, and a motor 55. The controller unit 67 process and manages the rotational speed of the suction fan 52. In the preferred embodiment of the present invention, the suction fan 52 is an axial fan. In alternate embodiments of the present invention, the suction fan 52 is a centrifugal fan. The suction fan 52 generates airflow into and out of the cylindrical body 2. The first mesh filter 57 and the debris screen 59 allow the airflow to remain continuous while limiting any particulates from the pet waste from entering the suction chamber 15. The second mesh filter 58 serves as a second level of filtration that prevents any particulates that may have possibly traversed through the first mesh filter 57 and the second mesh filter 58 from exiting the cylindrical body 2 and entering the air around the user. The first mesh filter 57 and the second mesh filter 58 are preferably high efficiency particulate air (HEPA) filters. The debris screen 59 is preferably a metal mesh screen. The at least one exhaust screen 60 locks the second mesh filter 58 within the suction chamber 15 and encloses the cylindrical body 2. Furthermore, the at least one exhaust covers the suction fan 52 within the suction chamber 15. The suction fan 52 is securely mounted within the suction chamber 15 with the housing 53. The impeller 54 is rotated by the motor 55 and, together, generate airflow. In order to effectively contain the pet waste and any particulates within the cylindrical body 2, the first mesh filter 57, the debris screen 59, the housing 53, and the second mesh filter 58 are mounted within the suction chamber 15 as the airflow comes in through the inlet 3 and through the outlet 4. More specifically, any particulates are limited from entering the suction chamber 15 as the first mesh filter 57 is positioned adjacent with the suction chamber 15. Furthermore, the debris screen 59 is positioned adjacent with the first mesh filter 57, opposite the debris chamber 14. In order for the suction fan 52 to remain uninhibited, the housing 53 is positioned adjacent with the debris screen 59, opposite the first mesh filter 57. Moreover, the housing 53 is concentrically positioned within the cylindrical body 2, defining a linear and continuous airflow through the cylindrical body 2. The second mesh filter 58 is positioned adjacent with the housing 53, opposite the debris screen 59, preventing any particulates from escaping past the outlet 4. The second mesh filter 58, along with the suction fan 52, the debris screen 59, and the first mesh filter 57 are securely housed as the at least one exhaust screen 60 is mounted across the outlet 4. Any wire connections between the controller unit 67 with the suction fan 52 and the portable power source 50 remain minimal as the controller unit 67 is mounted within the canister 1, adjacent to the portable power source 50. In order to generate airflow, the impeller 54 and the motor 55 are positioned within the housing 53. The impeller 54 preferably is positioned adjacent with the debris screen 59, and the motor 55 is positioned adjacent with the second mesh filter 58, thereby maximizing the suction into the cylindrical body 2. However, it is understood, in alternate embodiments of the present invention, the motor 55 is positioned adjacent with the debris screen 59, and the impeller 54 is positioned adjacent with the second mesh filter 58. In order to rotate the impeller 54, the impeller 54 is torsionally connected with a rotor 56 of the motor 55. The rotor 56 of the motor 55 rotates the impeller 54. In order for the motor 55 to be operated, the controller unit 67 is electronically connected with the motor 55. In order to turn the suction fan 52 on and off, the portable power source 50 is electrically connected to the controller unit 67, thereby allowing a user to connect and disconnect the flow of power between the portable power source 50 with the suction fan 52.

Figure 2:
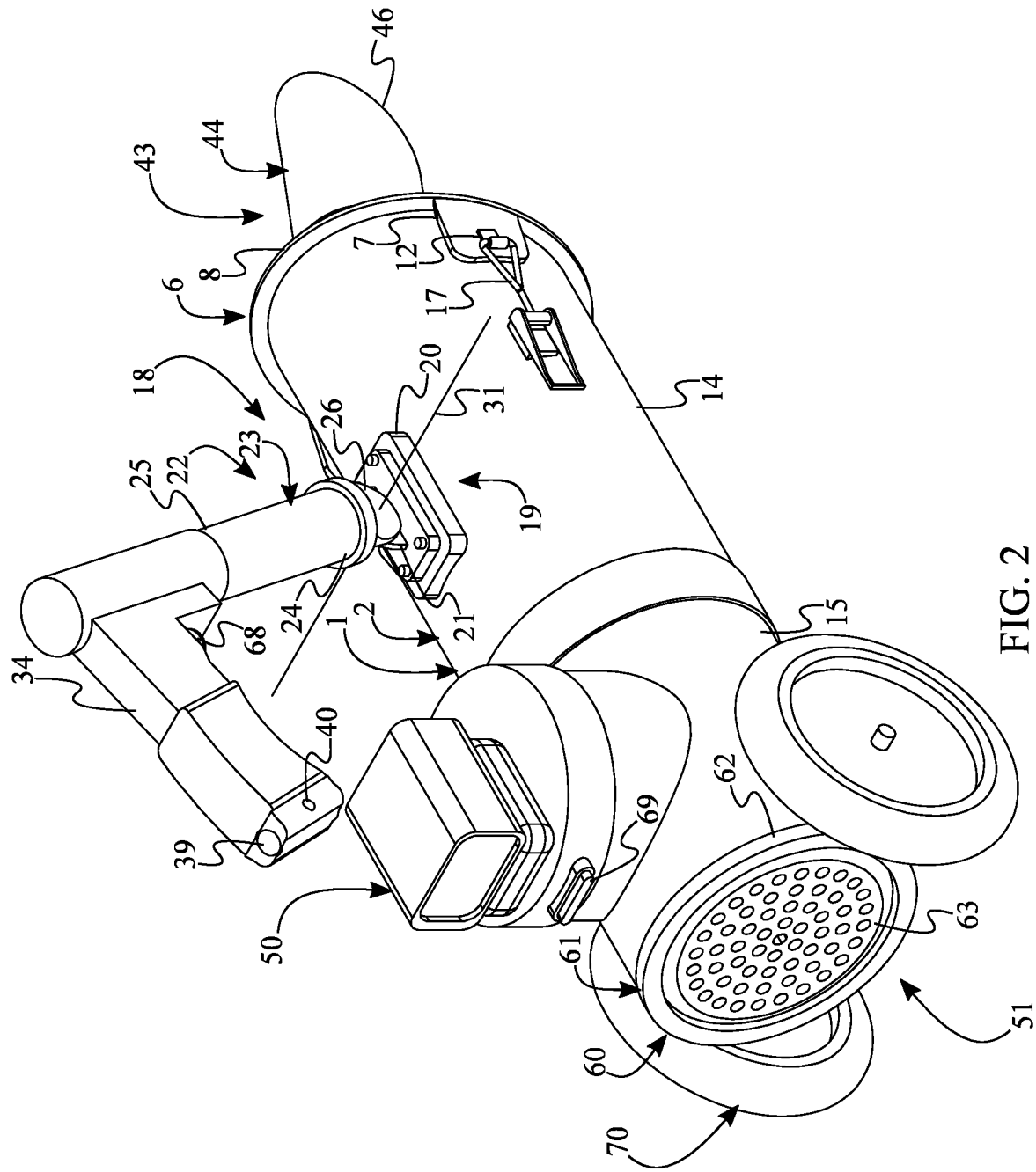
FIG. 2 is a rear perspective view of the first embodiment of the present invention.

In the preferred embodiment of the present invention, the at least one exhaust screen 60 comprise a first exhaust screen 61, seen in FIG. 2 and FIG. 5. Alternate embodiments of the present invention may comprise a variety of exhaust screens that engage with the cylindrical body 2 in various ways and prevent any small items from entering into the suction chamber 15 through the outlet 4. The first exhaust screen 61 comprises a first screen rim 62 and a perforated plate 63. The first screen rim 62 connects the first exhaust screen 61 with the cylindrical body 2. The perforated plate 63 serves as a shield across the first screen rim 62. In order to enclose the cylindrical body 2, the first screen rim 62 is perimetrically fixed around the perforated plate 63, and the perforated plate 63 is positioned across the outlet 4. The first screen rim 62 is attached onto the cylindrical body 2, thereby housing 53 second mesh filter 58, the suction fan 52, the debris screen 59 and the first mesh filter 57 within the suction chamber 15.

Depending on the number of debris and animal waste that needs to be collected and the size of the area with the debris and waste, the overall weight of the present invention may be taxing for the user. In order to alleviate the weight of the present invention and the collected animal waste, the present invention further preferably comprises a wheel assembly 70, seen in FIG. 1, FIG. 2, FIG. 3, and FIG. 4. The wheel assembly 70 allows the canister 1 to be rolled while simultaneously maneuvered with the handle grip 33 or the handle grip 33 and the forearm brace 36. In order for the canister 1 to be offset from the ground with the wheel assembly 70, the wheel assembly 70 is laterally mounted with the cylindrical body 2. Moreover, the wheel assembly 70 is positioned opposite to the at least one handle assembly 18 about the cylindrical body 2 as the ground is positioned opposite of the at least one handle assembly 18. In order for the airflow inlet nozzle 43 to remain oriented towards the ground and the canister 1 to be effectively supported while rolling across the ground, the wheel assembly 70 is positioned adjacent to the suction chamber 15 and is positioned offset with the outlet 4.

Although the invention has been explained in relation to its preferred embodiment, it is to be understood that many other possible modifications and variations can be made without departing from the spirit and scope of the invention as hereinafter claimed.

What is claimed is:

1. A collection device for debris and animal waste comprising:
   a canister;
   at least one handle assembly;
   an airflow inlet nozzle;
   a portable power source;
   a fan assembly;
   the canister comprising a cylindrical body, a lid, a debris hole, a debris chamber, and a suction chamber;
   the cylindrical body comprises an inlet and an outlet;
   the inlet being positioned opposite the outlet along the cylindrical body;
   the lid being hermetically attached across the inlet;
   the debris hole traversing through the lid;
   the airflow inlet nozzle being externally positioned with the canister;
   the airflow inlet nozzle being hermetically attached into the debris hole;
   the debris chamber being positioned within the cylindrical body, adjacent to the inlet;
   the suction chamber being positioned within the cylindrical body, adjacent to the outlet;
   the inlet being in fluid communication with the debris chamber;
   the debris chamber being in fluid communication with the suction chamber;
   the suction chamber being in fluid communication with the outlet;
   the fan assembly being mounted within the suction chamber;
   the at least one handle assembly and the portable power source being laterally mounted with the cylindrical body; and,
   the portable power source being electrically connected with the fan assembly;
   a controller unit;
   a trigger;
   the at least one handle assembly comprising a clamp base, a handlebar receiver, a first fastener, a handlebar, and a handle grip;

the handlebar comprising a proximal bar end and a distal bar end;

the clamp base being laterally mounted onto the cylindrical body;

the handlebar receiver being positioned adjacent with the clamp base;

the handlebar receiver being rotatably connected with the clamp base;

a rotation axis of the handlebar receiver being positioned perpendicular with a central axis of the cylindrical body;

the first fastener being operatively coupled with the handlebar receiver and the clamp base, wherein the first fastener is used to lock the handlebar receiver in a selected orientation with the clamp base and is used to unlock the handlebar receiver from the selected orientation with the clamp base;

the proximal bar end being attached into the handlebar receiver, opposite the clamp base;

the handle grip being fixed adjacent with the distal bar end;

the trigger being integrated into the handle grip;

the controller unit being mounted within the canister, adjacent to the portable power source;

the controller unit being electronically connected to the trigger and the fan assembly; and, the portable power source being electrically connected to the controller unit.

2. The collection device for debris and animal waste as claimed in claim 1 comprising:

a power button;

the power button being externally mounted to the canister, adjacent to the controller unit;

the power button being electronically connected with the controller unit; and, the power button being electrically connected with the portable power source.

3. The collection device for debris and animal waste as claimed in claim 1 comprising:

the clamp base comprising a base plate and a first mounting plate the handlebar receiver comprises a socket member and a second mounting plate;

the first mounting plate being positioned perpendicular to the base plate;

the first mounting plate being fixed onto the base plate, opposite the cylindrical body;

a closed socket end of the socket member being peripherally fixed with the second mounting plate;

an open socket end of the socket member being positioned offset from the second mounting plate;

the proximal bar end being attached into the open socket end;

the first mounting plate being laterally positioned with the second mounting plate; and, the first mounting plate being rotatably connected with the second mounting plate.

4. The collection device for debris and animal waste as claimed in claim 1 comprising:

the at least one handle assembly further comprising a clamping collar;

the handlebar comprising further comprising a main tube and an extension tube;

the main tube being positioned adjacent with the handlebar receiver;

the extension tube being telescopically engaged into the main tube, opposite the handlebar receiver;

the proximal bar end being positioned coincident with the main tube, offset the extension tube;

the distal bar end being positioned coincident with the extension tube, offset from the main tube; and, the clamping collar being operatively coupled with the extension tube, wherein the clamping collar is used to lock a selected positioned of the extension tube along the main tube and is used to unlock the selected positioned of the extension tube along the main tube.

5. The collection device for debris and animal waste as claimed in claim 4 comprising:

the at least one handle assembly further comprising a forearm brace, an extension post, a post-receiving channel, a main hole, a plurality of secondary holes, and a fastener;

a brace opening of the forearm brace being positioned offset from the extension post;

the brace opening being oriented towards the handlebar;

the forearm brace being terminally fixed with the extension post;

the post-receiving channel laterally traversing through the handle grip;

the post-receiving channel being positioned offset from the handlebar along the handle grip;

the post-receiving channel being oriented at an obtuse angle with the handle grip;

the main hole laterally traversing through the handle grip;

the post-receiving channel being perpendicularly intersected by the main hole;

each of the plurality of secondary holes laterally traversing through the extension post;

the plurality of secondary holes being positioned offset from the forearm brace along the extension post; and, the fastener being engaged through the main hole and through a selected hole from the plurality of secondary holes.

\* \* \* \* \*